US006461074B2

United States Patent
Taylor

(10) Patent No.: US 6,461,074 B2
(45) Date of Patent: Oct. 8, 2002

(54) LOCKING MECHANISM FOR TELESCOPICALLY ADJUSTABLE EXTENSION POLE

(75) Inventor: Curtis E. Taylor, Chagrin Falls, OH (US)

(73) Assignee: The Sherwin-Williams Company, Cleveland, OH (US)

( * ) Notice: Subject to any disclaimer, the term of this patent is extended or adjusted under 35 U.S.C. 154(b) by 0 days.

(21) Appl. No.: 09/852,096

(22) Filed: May 9, 2001

(65) Prior Publication Data

US 2001/0024594 A1 Sep. 27, 2001

Related U.S. Application Data

(62) Division of application No. 09/353,517, filed on Jul. 14, 1999, now Pat. No. 6,254,305.

(51) Int. Cl.[7] .................................................. B25G 1/04
(52) U.S. Cl. .................. 403/378; 403/109.1; 15/144.4; 16/429
(58) Field of Search .......................... 403/109.1, 109.2, 403/109.6, 104, 377, 378, 379.5, 379.3; 16/429; 15/144.4; 248/188.5, 333

(56) References Cited

U.S. PATENT DOCUMENTS

| | | | | |
|---|---|---|---|---|
| 3,596,946 A | * | 8/1971 | Burton et al. | |
| 3,603,623 A | * | 9/1971 | Widman | |
| 3,980,805 A | * | 9/1976 | Lipari | 403/378 |
| 4,183,691 A | * | 1/1980 | Van Melle | 403/109.3 |
| 4,647,241 A | * | 3/1987 | Weber | 403/378 X |
| 4,662,771 A | * | 5/1987 | Roe et al. | 403/108 |
| 5,797,696 A | * | 8/1998 | Baynes et al. | 403/377 |
| 5,899,481 A | * | 5/1999 | Ferrarin | 403/378 X |
| 6,254,305 B1 | * | 7/2001 | Taylor | 403/378 |

* cited by examiner

Primary Examiner—Greg Binda
Assistant Examiner—John R. Cottingham
(74) Attorney, Agent, or Firm—Robert E. McDonald; Vivien Y. Tsang; James A. Hudak

(57) ABSTRACT

A locking mechanism for a telescopically adjustable extension pole is disclosed. The locking mechanism includes a collar member and a locking trigger mechanism preferably comprising a bottom trigger member and a top trigger member having a locking pin therein. The top trigger member grippingly engages the collar member which is attached to the outer sleeve of the pole. By depressing the bottom trigger member, the top trigger member moves laterally outwardly retracting the locking pin from an aperture in the inner sleeve permitting the length of the extension pole to be telescopically adjusted. By releasing the bottom trigger member, the top trigger member moves laterally inwardly causing the locking pin to be received within an aperture in the inner sleeve so as to interlock the inner sleeve within the outer sleeve at the approximate desired length of the extension pole.

7 Claims, 5 Drawing Sheets

US 6,461,074 B2

LOCKING MECHANISM FOR TELESCOPICALLY ADJUSTABLE EXTENSION POLE

This application is a divisional of application Ser. No. 09/353,517 filed on Jul. 14, 1999 now U.S. Pat. No. 6,254,305.

TECHNICAL FIELD

The present invention relates, in general, to an adjustable extension pole and, more particularly, to an improved locking mechanism for a telescopically adjustable extension pole.

BACKGROUND ART

There are numerous types of extension poles that can be used for painting or other applications, e.g., sweeping attachments, swimming pool cleaning nets, and which allow the user to adjust the overall length thereof. For example, such poles permit the attachment of a paint roller frame to the end thereof allowing the painter to paint walls and ceilings without the use of a ladder. Such poles typically utilize telescoping members for length adjustment purposes and some type of locking mechanism to interlock the telescoping members after the desired length of the pole has been attained. It has been found that these locking mechanisms usually have some type of inherent structural or operational disadvantages. For example, the adjustable extension pole disclosed in U.S. Pat. No. 5,220,707 (Newman, Sr., et al.) utilizes a locking mechanism comprising a Belleville-type washer arrangement which is connected to a pin which interlocks the outer telescoping sleeve within the inner telescoping sleeve. By depressing a push button operatively connected to the Belleville-type washer, the washer is deformed causing the pin to be withdrawn from the inner sleeve permitting the inner sleeve to be telescopically adjusted within the outer sleeve. Operationally, the aforementioned locking mechanism has some inherent disadvantages since, through use, the washer becomes fatigued causing the locking mechanism to malfunction. In addition, since a push button arrangement is used, paint can be easily entrapped under and around same affecting the "snap-action" ability of the Belleville-type washer.

Another tube or sleeve locking mechanism is disclosed in U.S. Pat. No. 3,596,946 (Burton, et al.) which utilizes an unidirectional cam lock arrangement to interlock the sleeves after the desired length of the extension pole has been attained. In this case, the inner and outer sleeves must be properly aligned in order to operate the cam locking arrangement and the cam locking arrangement is susceptible to paint becoming entrapped therein causing the malfunction of same. Another tube or sleeve locking mechanism is disclosed in U.S. Pat. No. 4,662,771 (Roe, et al.). In this case, the locking mechanism is comprised of a relatively complex ball and detent arrangement received between machined sleeves connected to the extension pole. The ball and detent arrangement is relatively costly to produce, and the resulting locking mechanism is susceptible to paint being entrapped therein resulting in the possible malfunction of same. A further tube or sleeve locking mechanism is disclosed in U.S. Pat. No. 3,603,623 (Widman). This locking mechanism utilizes oppositely wound coil springs which surround the inner tubular sleeve. By changing the bias on the springs which can be accomplished by moving external knobs on the outer surface of the locking mechanism, the inner sleeve is released permitting its telescopic adjustment within the outer sleeve. In this case, the coil springs are subject to fatigue and breakage, and the locking mechanism is susceptible to paint being entrapped therein due to its use of external knobs to change the bias on the springs within same. Lastly, U.S. Pat. No. 5,288,161 (Graves, et al.) discloses a locking mechanism which interlocks the end of an extension pole to the end of a paint roller frame. In this case, the extension pole is not telescopically adjustable, however, the locking mechanism permits the attachment of the pole, which can be any length, to the end of the paint roller frame. The locking mechanism disclosed in this patent is comprised of a lever arrangement which is external to the end of the pole, and thus, is very susceptible to paint being entrapped therein causing the locking mechanism to become difficult to operate or inoperable.

Because of the fore going inherent disadvantages associated with presently available extension poles, it has become desirable to develop an extension pole locking mechanism that is durable, is easy to produce, assemble and operate and which is not susceptible to paint being entrapped therein.

SUMMARY OF THE INVENTION

The present invention solves the problems associated with prior art extension poles and other problems by providing an extension pole locking mechanism which comprises a minimum number of components, is less susceptible to paint being entrapped therein, and is extremely simple to produce and operate. The locking mechanism of the present invention comprises an outer tubular sleeve, an inner tubular sleeve received within the outer tubular sleeve and a collar assembly attached to the outer tubular sleeve. The collar assembly comprises a collar member attached to the outer tubular sleeve and a locking trigger mechanism which is received over the collar member and includes a bottom trigger member and a top trigger member having a locking pin therein. The top trigger member has a circular configuration and grippingly engages the collar member. The bottom trigger member has a U-shaped configuration and interlocks with the top trigger member. Because of the U-shaped configuration of the bottom trigger member, when the top and bottom trigger members are interlocked, a gap is created between the inner surface of the bottom trigger member and the collar member. By depressing the bottom trigger member, the gap between the bottom trigger member and the collar member closes causing the top trigger member to move laterally outwardly retracting the locking pin from the inner tubular sleeve permitting the length of the extension pole to be adjusted. After the desired length of the pole has been attained, if pressure is released on the bottom trigger member, the top trigger member will move laterally inwardly causing the locking pin therein to be received in an aperture in the inner tubular sleeve locking the inner tubular sleeve within the outer tubular sleeve at the approximate desired length of the extension pole.

Accordingly, it is an object of the present invention to provide an extension pole locking mechanism which utilizes a minimum number of components.

Another object of the present invention is to provide an extension pole locking mechanism which is less susceptible to paint being entrapped therein.

A still another object of the present invention is to provide an extension pole locking mechanism that is durable.

A further object of the present invention is to provide an extension pole locking mechanism that is relatively inexpensive to produce and is easy to assemble.

A still further object of the present invention is to provide an extension pole locking mechanism that can be easily replaced, if necessary.

DESCRIPTION OF THE PREFERRED EMBODIMENT

Figure 1:
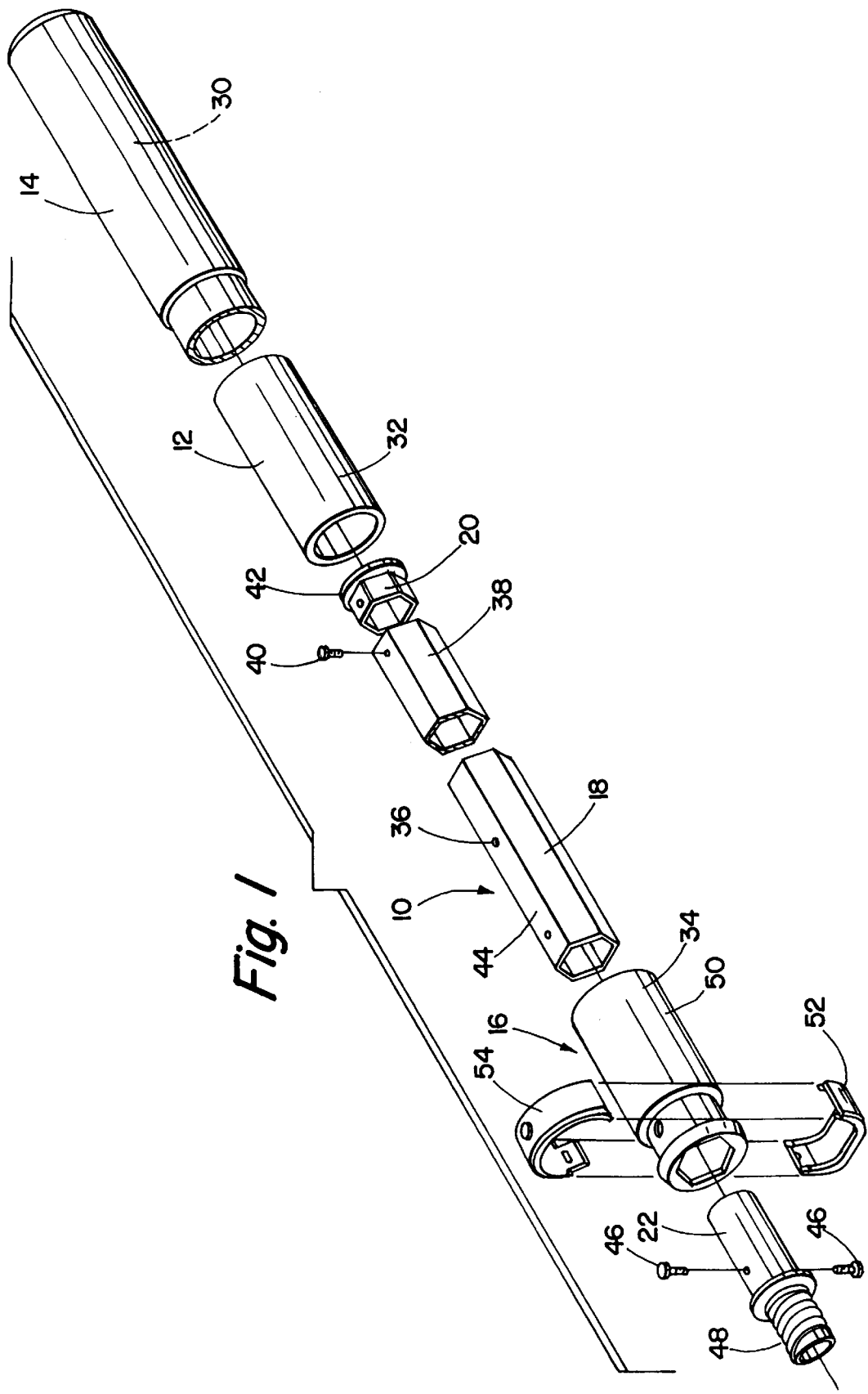
FIG. 1 is an exploded perspective view of an extension pole utilizing the locking mechanism of the present invention.

Referring now to the drawings where the illustrations are for the purpose of describing the preferred embodiment of the present invention and not intended to limit the invention described herein, FIG. 1 is an exploded perspective view of a telescopically adjustable extension pole 10 utilizing the sleeve locking mechanism of the present invention. Extension pole 10 is comprised of an outer tubular sleeve 12 having a grip 14 at one end thereof and a collar assembly 16 at the opposite end thereof, and an inner tubular sleeve 18 received within the outer tubular sleeve 12. The inner tubular sleeve 18 has an end cap 20 attached to one end thereof and a threaded connector 22 attached to the opposite end thereof.

The outer tubular sleeve 12 can be fabricated from a metallic or a non-metallic material, such as nylon or the like. If a nylon material is utilized, fiberglass can be added to same to increase strength. The grip 14 has an inner diameter slightly less than the outer diameter of outer tubular sleeve 12 permitting grip 14 to be slip fit over end 30 of outer tubular sleeve 12 and to be grippingly retained thereon. The opposite end 32 of outer tubular sleeve 12 is press fit into one end 34 of collar assembly 16. The inner tubular sleeve 18 is sized so as to be receivable and telescopically movable within outer tubular sleeve 12 and is typically formed from metallic material and is preferably hexagonal in cross-section, however, the configuration of this sleeve 18 can be polysided, such as square or octagonal. A plurality of apertures 36 is provided in a spaced-apart relationship along one surface of the inner tubular sleeve 18. End cap 20 has a configuration complementary to inner tubular sleeve 18 permitting it to be received within end 38 of inner tubular sleeve 18 and to be retained therein by a fastener 40 which passes through the inner tubular sleeve 18 and into end cap 20. End cap 20 has a circular flanged surface 42 at one end thereof. Flanged surface 42 has an outer diameter slightly less than the inner diameter of the outer tubular sleeve 12. Threaded connector 22 is received within the opposite end 44 of inner tubular sleeve 18 and is retained therein by oppositely disposed fasteners 46 which are threadably received through the inner tubular sleeve 18 and into the body of threaded connector 22. Threaded connector 22 has a threaded end 48 which is received in a complementary female threaded connector provided in the end of the handle for a paint roller frame (not shown).

Figure 2:
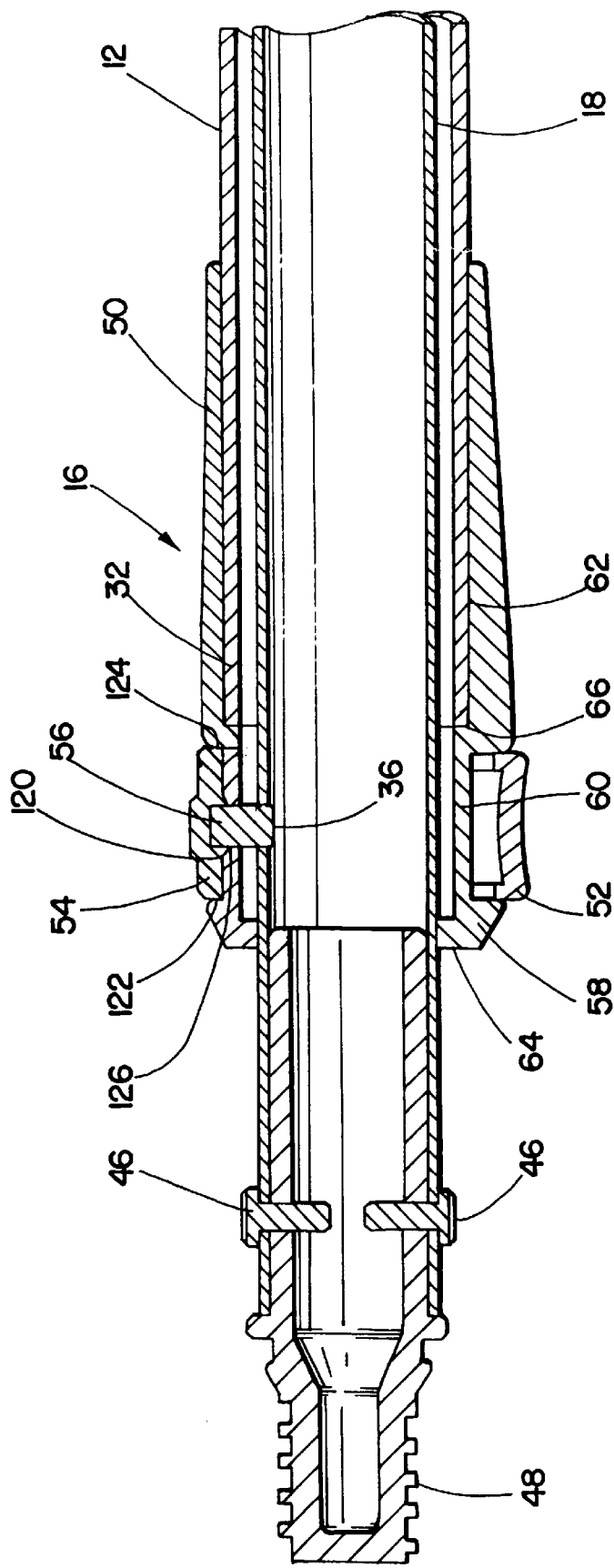
FIG. 2 is a cross-sectional view of one end of the extension pole illustrated in FIG. 1 and shows the attachment of the outer sleeve of the pole to the collar assembly utilizing the locking mechanism of the present invention.

Collar assembly 16 is comprised of a collar member 50, a bottom trigger member 52, a top trigger member 54 and a locking pin 56 (shown in FIG. 2). Referring now to FIG. 2, which is cross-sectional view of the collar member 50 and illustrates its attachment to the outer tubular sleeve 12 and the position of the inner tubular sleeve 18 within same, collar member 50 is generally circular in cross-section and is comprised of an end portion 58, a first bore portion 60 and a second bore portion 62. End portion 58 has a bore 64 therethrough having a configuration complementary to the configuration of the inner tubular sleeve 18, i.e., if inner tubular sleeve 18 is hexagonal in shape, bore 64 in end portion 58 will be similarly hexagonal in shape and will be sized slightly larger than inner tubular sleeve 18 permitting inner tubular sleeve 18 to be telescopically movable within outer tubular sleeve 12. The complementary configurations of inner tubular sleeve 18 and bore 64 in end portion 58 prevents the inner tubular sleeve 18 from rotating relative to collar assembly 16 and outer tubular sleeve 12. First bore portion 60 has a diameter slightly less than the diameter of the second bore portion 62. The diameter of second bore portion 62 is slightly less than the outer diameter of the outer tubular sleeve 12 permitting end 32 of outer tubular sleeve 12 to be press fit within second bore portion 62 of collar member 50 and to be grippingly retained within same. Outer tubular sleeve 12 is received and positioned within collar member 50 such that its end 32 abuts shoulder 66 defined by the junction of first bore portion 60 with second bore portion 62 of collar member 50.

Figure 3:
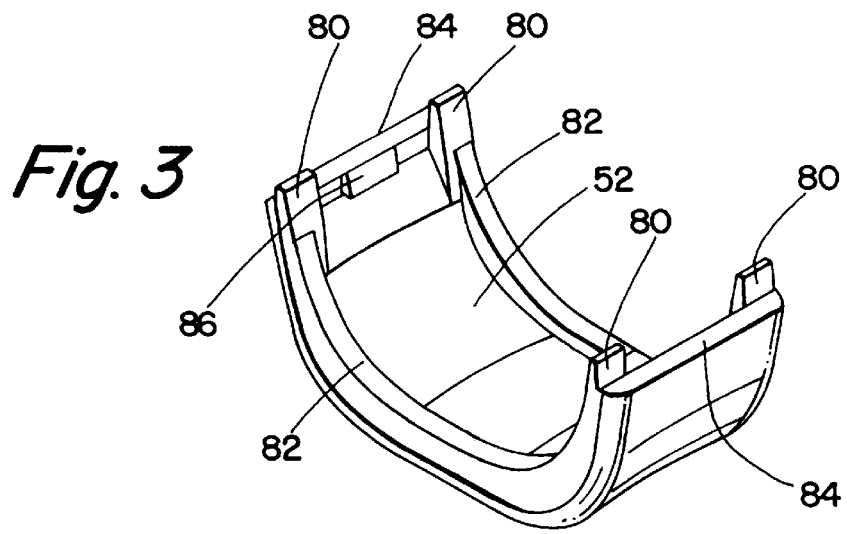
FIG. 3 is a perspective view of the bottom trigger member of the collar assembly shown in FIGS. 1 and 2.
Figure 4:
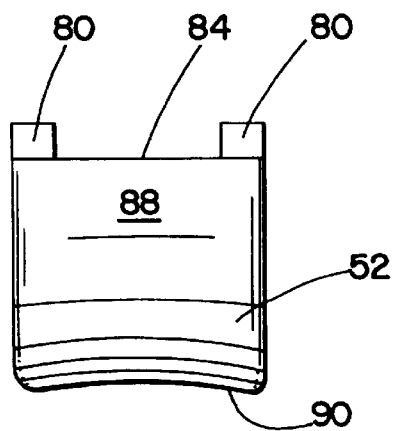
FIG. 4 is a right end elevational view of the bottom trigger member of the collar assembly shown in FIGS. 1 and 2.
Figure 7:
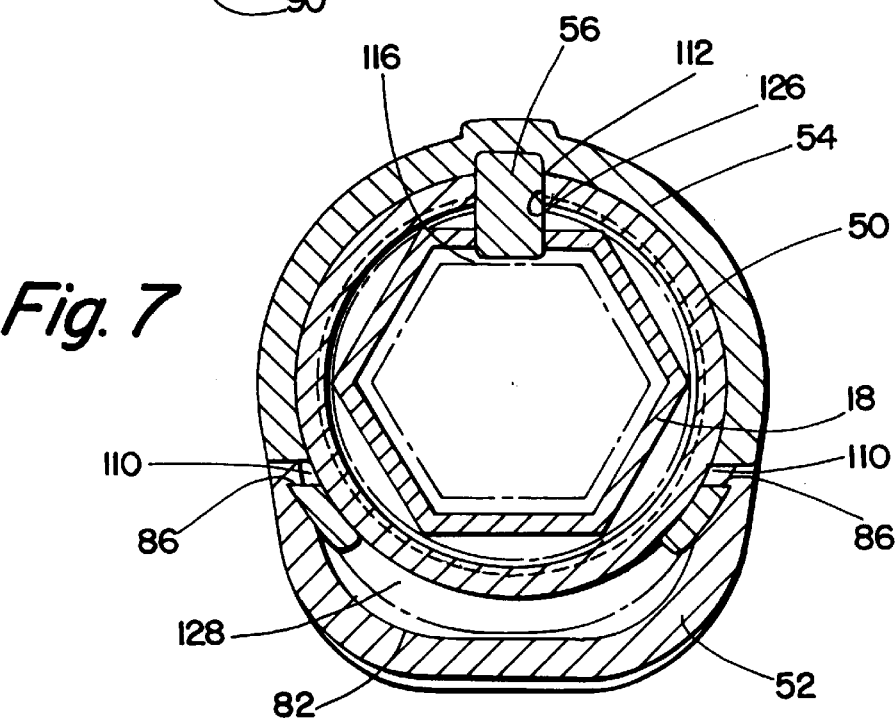
FIG. 7 is an enlarged cross-sectional view of the collar assembly shown in FIGS. 1 and 2.
Figure 5:
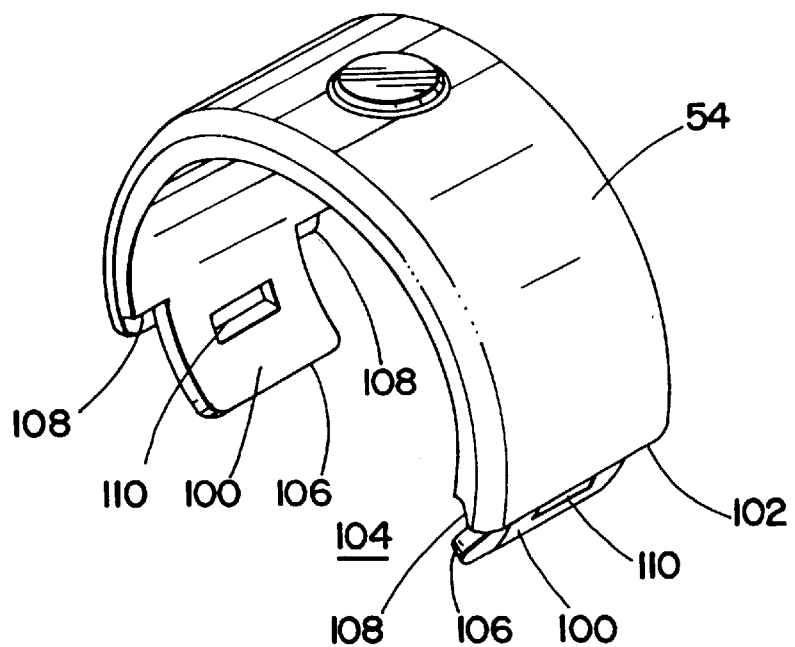
FIG. 5 is a perspective view of the top trigger member of the collar assembly shown in FIGS. 1 and 2.
Figure 6:
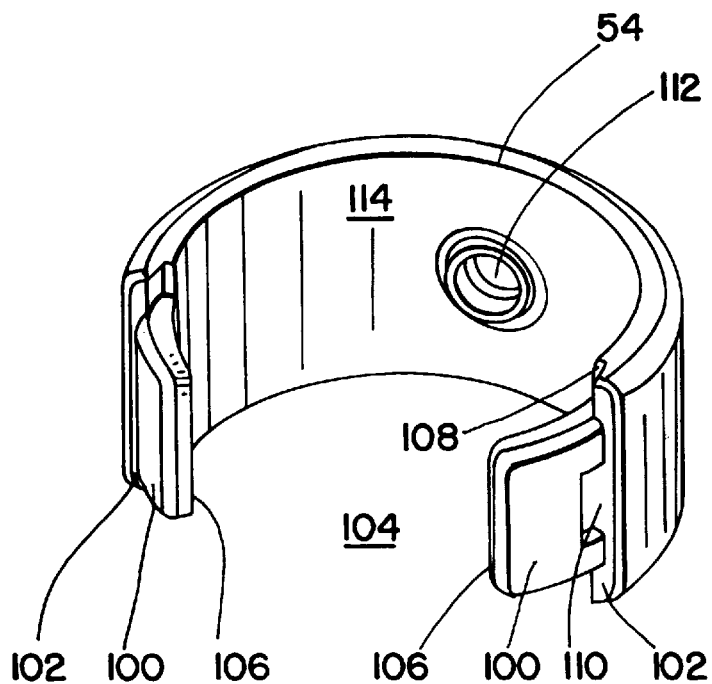
FIG. 6 is another perspective view of the top trigger member of the collar assembly shown in FIGS. 1 and 2.
Figure 9:
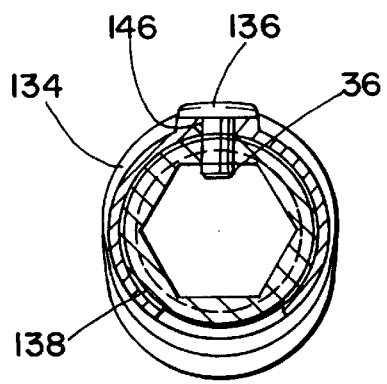
FIG. 9 is a cross-sectional view taken a cross section-indicating lines 9—9 in FIG. 8.
Figure 8:
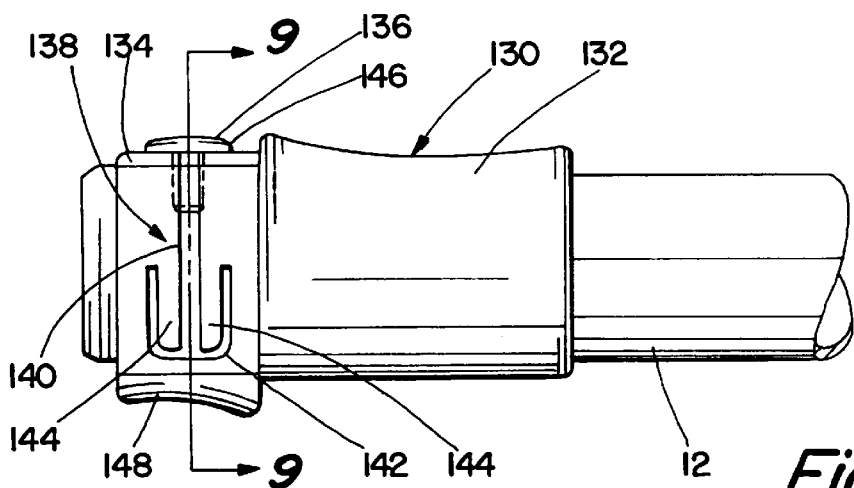
FIG. 8 is a side elevational view, partially broken away in cross-section, of an alternate embodiment of a collar assembly including a unitary trigger member.
Figure 10:
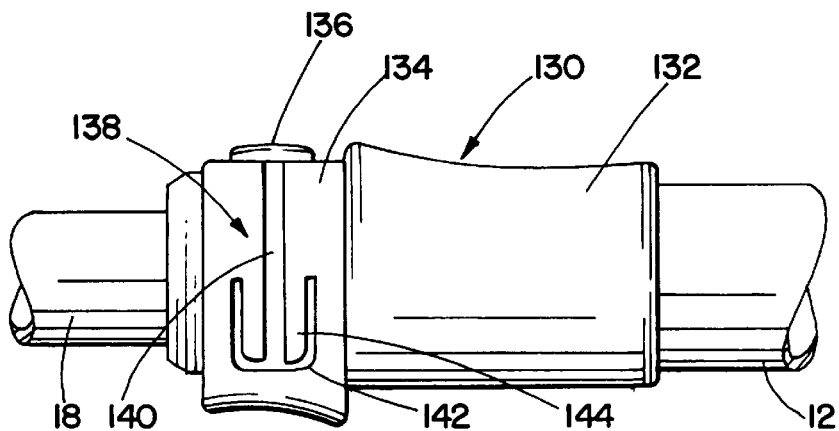
FIG. 10 is a side elevational view of the alternate embodiment of the present invention shown in FIG. 7 and illustrates the locking mechanism in an engaged or locked condition.

Bottom trigger member 52 is formed from moldable plastic material and is generally U-shaped in configuration, as shown in FIGS. 3 and 4, and has a pair of spaced apart projections or ears 80 on the inner surface 82 and adjacent each outer end 84 thereof. An inwardly directed lip 86 is located on the inner surface 82 of bottom trigger member 52 and is positioned between each pair of ears 80. The outer surface 88 of bottom trigger member 52 is provided with a flattened surface 90 for placement of the user's thumb in order to facilitate depressing bottom trigger member 52 to adjust the overall length of extension pole 10, as hereinafter described. The top trigger member 54 is generally circular in configuration, as shown in FIGS. 5 and 6, with a tab 100 adjacent each outer end 102 thereof. An angularly extending gap 104 is provided between the ends 106 of the tabs 100. A recess 108 that is sized so as to receive an ear 80 on bottom trigger member 52 is provided on either side of each tab 100. In addition, an elongated recess 110 that is sized so as to receive inwardly directed lip 86 on bottom trigger member 52 is provided in each tab 100. Locking pin 56 is provided within a blind bore 112 in the inner surface 114 of top trigger member 54 and is positioned so as to be substantially oppositely disposed to angularly extending gap 104. Alternatively, locking pin 56 can be received within a through bore (not shown) in top trigger member 54 and can be positioned and retained therein so as to be substantially oppositely disposed to angularly extending gap 104. The end 116 of locking pin 56 is chamfered, as shown in FIG. 7, providing a pilot or guiding surface for same.

The top trigger member 54 is formed from a flexible plastic material and has an inner diameter slightly less than the outer diameter portion 120 of collar member 50 which is positioned adjacent first bore portion 60 thereof, as shown in FIG. 2. In this manner, the top trigger member 54 can be slipped over outer diameter portion 120 of collar member 50 and is grippingly retained thereon. The diameter of outer diameter portion 120 is slightly less than the immediately adjacent diameters of end portion 58 and second bore portion 62 of collar member 50 forming shoulders 122 and 124, respectively, which minimize the possibility of any foreign material becoming entrapped between trigger members 52, 54 and outer diameter portion 120 of collar member 50. Outer diameter portion 120 of collar member 50 has a bore 126 therethrough for receipt of locking pin 56 in top trigger member 54. Bore 126 is aligned with apertures 36 in inner tubular sleeve 18. After top trigger member 54 has been received on outer diameter portion 120 of collar member 50, bottom member trigger member 52 is press fit into top trigger member 54 causing each oppositely disposed ear 80 on each end 84 of bottom trigger member 52 to be received within a complementary elongated recess 108 on top trigger member 54 and also causing inwardly directed lip 86 adjacent each end 84 of bottom trigger member 54 to be received within its complementary elongated recess 110 provided in tab 100 on top member 54, as shown in FIG. 7. In this manner, the ears 80 and the inwardly directed lip 86 on the bottom trigger member 52 interlock with the complementary recesses 108 and 110 on top trigger member 54 causing the bottom trigger member 52 and the top trigger member 54 to be joined and move as a unit. In addition, since top trigger member 54 grippingly engages outer diameter portion 120 of collar member 50 and since bottom trigger member 52 is U-shaped rather than circular in configuration, the interlocking engagement of these members causes a gap 128 to be created between the inner surface 82 of bottom trigger member 52 and the adjacent surface defining the outer diameter portion 120 of collar member 50.

In order to adjust the length of the extension pole 10, the surface 90 on bottom trigger member 52 is pressed laterally inwardly against outer tubular sleeve 12 causing the gap 128 to close and causing the top trigger member 54, which is formed from flexible plastic material, to move laterally outwardly with respect to collar member 50 resulting in locking pin 56 in top trigger member 54 being retracted from aperture 36 in inner tubular sleeve 18 through bore 126 in outer diameter portion 120 of collar member 50. The distance of lateral movement of the trigger members 52, 54 is less than the height of shoulders 122, 124 on collar member 50 minimizing the possibility of any foreign material passing between the trigger members 52, 54 and the shoulders 122, 124 and becoming entrapped between the trigger members 52, 54 and the outer diameter portion 120 of the collar member 50. The inner tubular sleeve 18 can then be telescopically adjusted within outer tubular sleeve 12 until the approximate desired length of the extension pole 10 has been attained. If the bottom trigger member 52 is then released, the gap 128 opens causing the top trigger member 54 to move laterally inwardly with respect to collar member 50 resulting in the chamfered end 116 of locking pin 56 contacting the outer surface of inner tubular sleeve 18. Further telescopic adjustment of inner tubular sleeve 18 within outer tubular sleeve 12 causes the locking pin 56 to be received within the closest aperture 36 provided within the inner tubular sleeve 18 resulting in the inner tubular sleeve 18 being locked within the outer tubular sleeve 12 at the approximate desired length of the extension pole 10. (The chamfered end 116 of locking pin 56 acts as a pilot or guiding surface which assists in the receipt of the locking pin 56 in the closest aperture 36.) The circular flanged surface 42 on end cap 20 prevents the inner tubular sleeve 18 from being inadvertently removed from within the outer tubular sleeve 12 during the telescopic adjustment process. In this manner, the length of the extension pole 10 can be easily adjusted and, when adjusted, the length is retained by the locking pin 56 in the top trigger member 54 being received in the appropriate aperture 36 in the inner tubular sleeve 18.

The locking mechanism of the present invention provides a number of advantages over prior art locking mechanisms. For example, the locking mechanism utilizes a minimum number of components which, because of their design, makes the locking mechanism less susceptible to paint being entrapped therein. In addition, the components comprising the locking mechanism (bottom trigger member 52, top trigger member 54 and locking pin 56) are relatively inexpensive and easy to produce and assemble. Also, the components comprising the locking mechanism are very durable, however, they can be easily replaced, if necessary.

Figure 11:
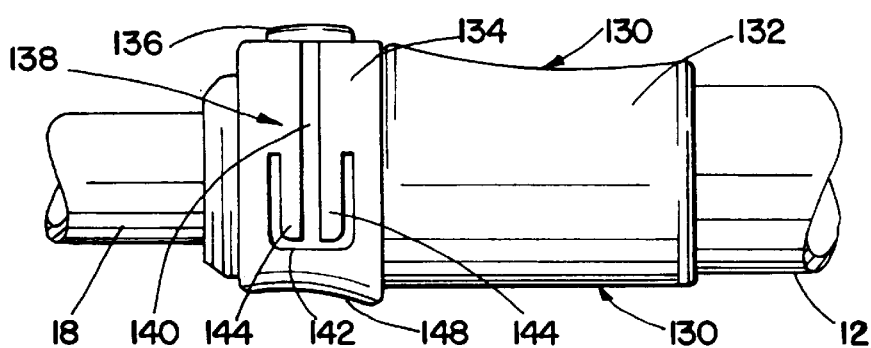
FIG. 11 is a side elevational view of the alternate embodiment of the present invention shown in FIGS. 7 and 10 and illustrates the locking mechanism in a disengaged or unlocked condition permitting the adjustment of the overall length of the extension pole.

An alternate embodiment of the locking mechanism of the present invention is shown in FIGS. 8 through 11 which illustrate a collar assembly 130 (locking mechanism) attached to the end of the outer tubular sleeve 12 of the extension pole 10. In this embodiment, the collar assembly 130 is comprised of a collar member 132 and a trigger member 134 having a locking pin 136 therein. The trigger member 134 is of a one-piece, rather than a two-piece, construction, is formed from flexible plastic material, and is received over the collar member 132. The outer portion of trigger member 134 is generally oval in configuration, but its inner portion, shown generally by the numeral 138, is circular in configuration. The inner portion 138 of the trigger member 134 has a circumferential slot 140 therein which terminates in a U-shaped slot 142 defining circumferential tangs 144. The trigger member 134 is positioned on the collar member 132 such that the inner portion 138 grippingly engages the outer diameter of the collar member 132 permitting the locking pin 136 to be positioned within a bore 146 in collar member 132 and received in an aperture 36 in inner tubular sleeve 18. The circumferential slot 140, U-shaped slot 142 and circumferential tangs 144 in the inner portion 138 provide flexibility to the inner portion 138 of the trigger member 134 permitting lateral outward movement of the trigger member 134 with respect to the collar member 132. In order to adjust the overall length of the extension pole 10, surface 148 on trigger member 134 is pressed inwardly, as shown in FIG. 11, causing trigger member 134 to move laterally outwardly with respect to collar member 132 resulting in locking pin 136 being retracted through bore 146 in collar member 132. The inner tubular sleeve 18 can then be telescopically adjusted within outer tubular sleeve 12 until the approximate desired length of the extension pole 10 has been attained. If the trigger member 134 is then released, the trigger member 134 will move laterally inwardly causing the locking pin 136 to be received in the closest aperture 36 provided in inner tubular sleeve 18 resulting in inner tubular sleeve 18 being locked within the outer tubular sleeve 12 at the approximate desired length of the extension pole 10.

Certain modifications and improvements will occur to those skilled in the art upon reading the foregoing. It should be understood that all such modifications and improvements have not been expressly set forth herein for the sake of conciseness and readability, but are properly within the scope of the following claims.

I claim:

1. A locking mechanism in combination with a pair of inner and outer telescoping members, said locking mechanism comprising a collar member having a longitudinally extending opening therein permitting the receipt of said collar member on said outer telescoping member and having an aperture therethrough intersecting said longitudinally extending opening, and a trigger member substantially encircling said collar member and having an opening therethrough permitting the receipt of said trigger member on said collar member and having a locking pin therein, said trigger member comprising an inner member portion and an outer member portion which are joined together over a portion of their respective peripheries, said locking pin being received through said aperture in said collar member and into said inner and outer telescoping members to lockingly engage said inner and outer telescoping members together.

2. The locking mechanism as defined in claim 1 wherein said inner member portion is substantially circular in cross-section and grippingly engages said collar member.

3. The locking mechanism as defined in claim 1 wherein said locking pin is operatively attached to said inner member portion and is directed radially inwardly thereof.

4. The locking mechanism as defined in claim 1 wherein said outer member portion is substantially oval in configuration causing a portion of the inner surface thereof to be in a spaced-apart relationship with a portion of the surface defining said collar member.

5. The locking mechanism as defined in claim 1 wherein said outer member portion substantially surrounds said inner member portion.

6. The locking mechanism as defined in claim 5 further including a slot interposed between said inner member portion and said outer member portion permitting lateral movement of said inner member portion with respect to said collar member allowing said locking pin to be retracted within said aperture in said collar member releasing said inner and outer telescoping members from locking engagement allowing relative movement between said inner and outer telescoping members.

7. The locking mechanism as defined in claim 6 wherein said slot is substantially U-shaped in configuration.

* * * * *